R. W. PITTMAN.
MOTION PICTURE APPARATUS.
APPLICATION FILED DEC. 12, 1913. RENEWED JULY 10, 1920.
1,413,610.
Patented Apr. 25, 1922
3 SHEETS—SHEET 1.
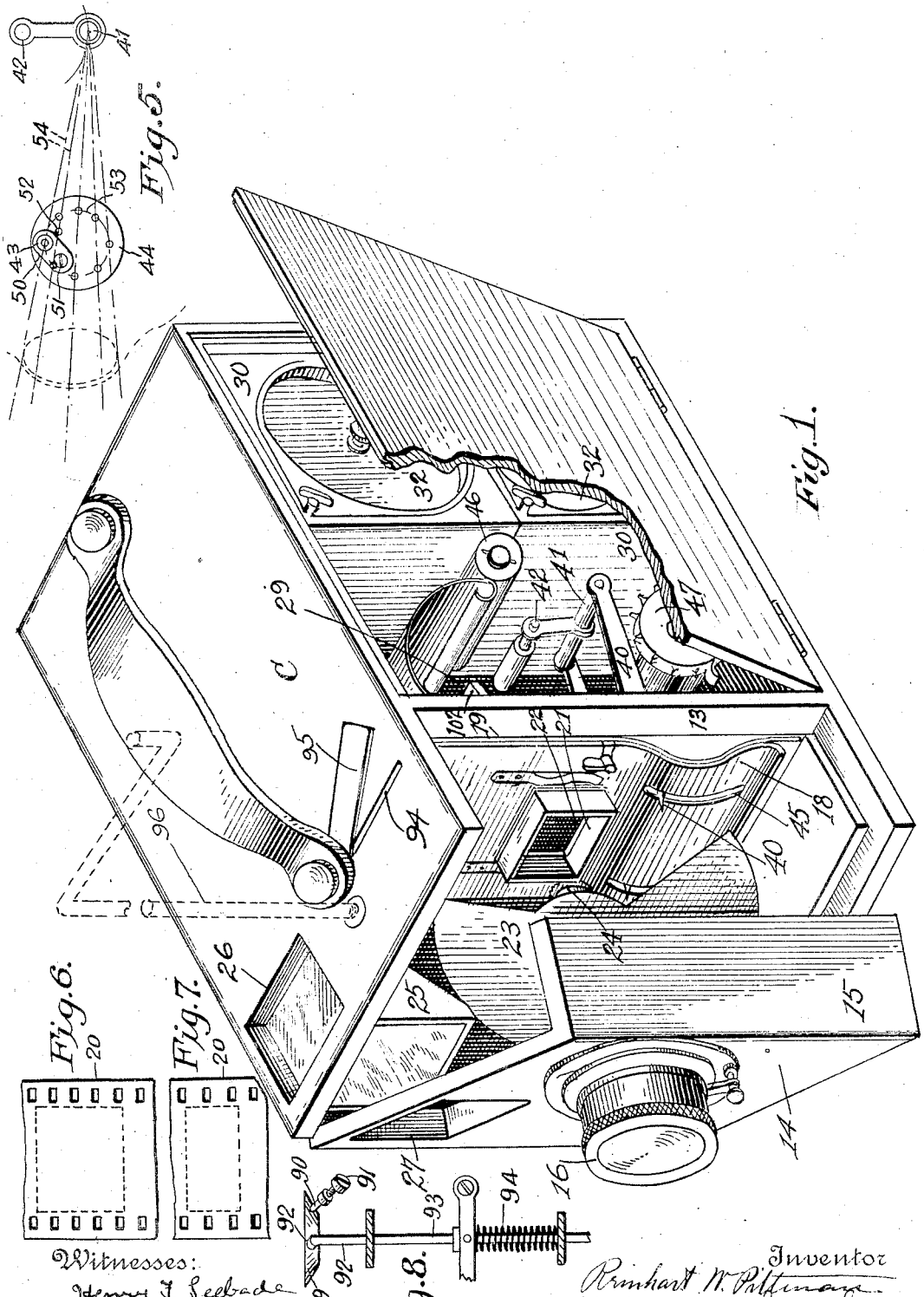

R. W. PITTMAN.
MOTION PICTURE APPARATUS.
APPLICATION FILED DEC. 12, 1913. RENEWED JULY 10, 1920.
1,413,610.
Patented Apr. 25, 1922.
3 SHEETS—SHEET 2.
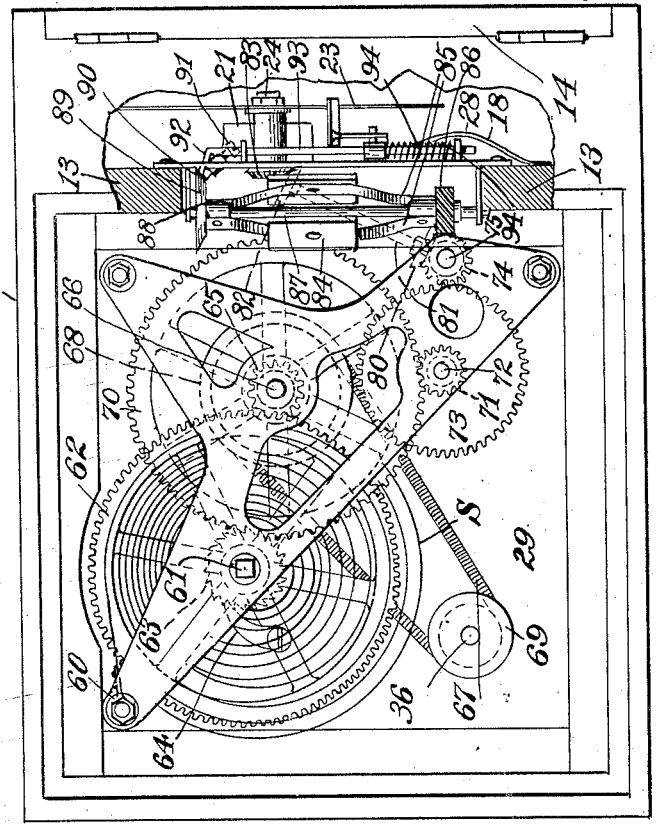
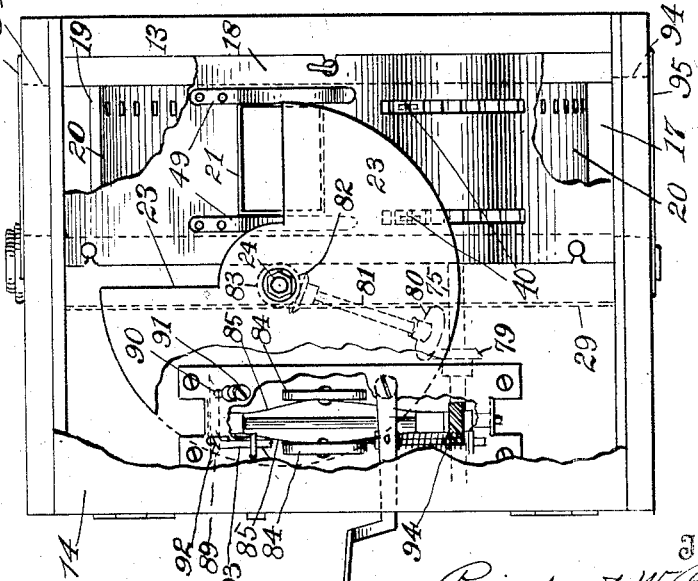
Inventor
Reinhart W. Pittman
By his Attorney

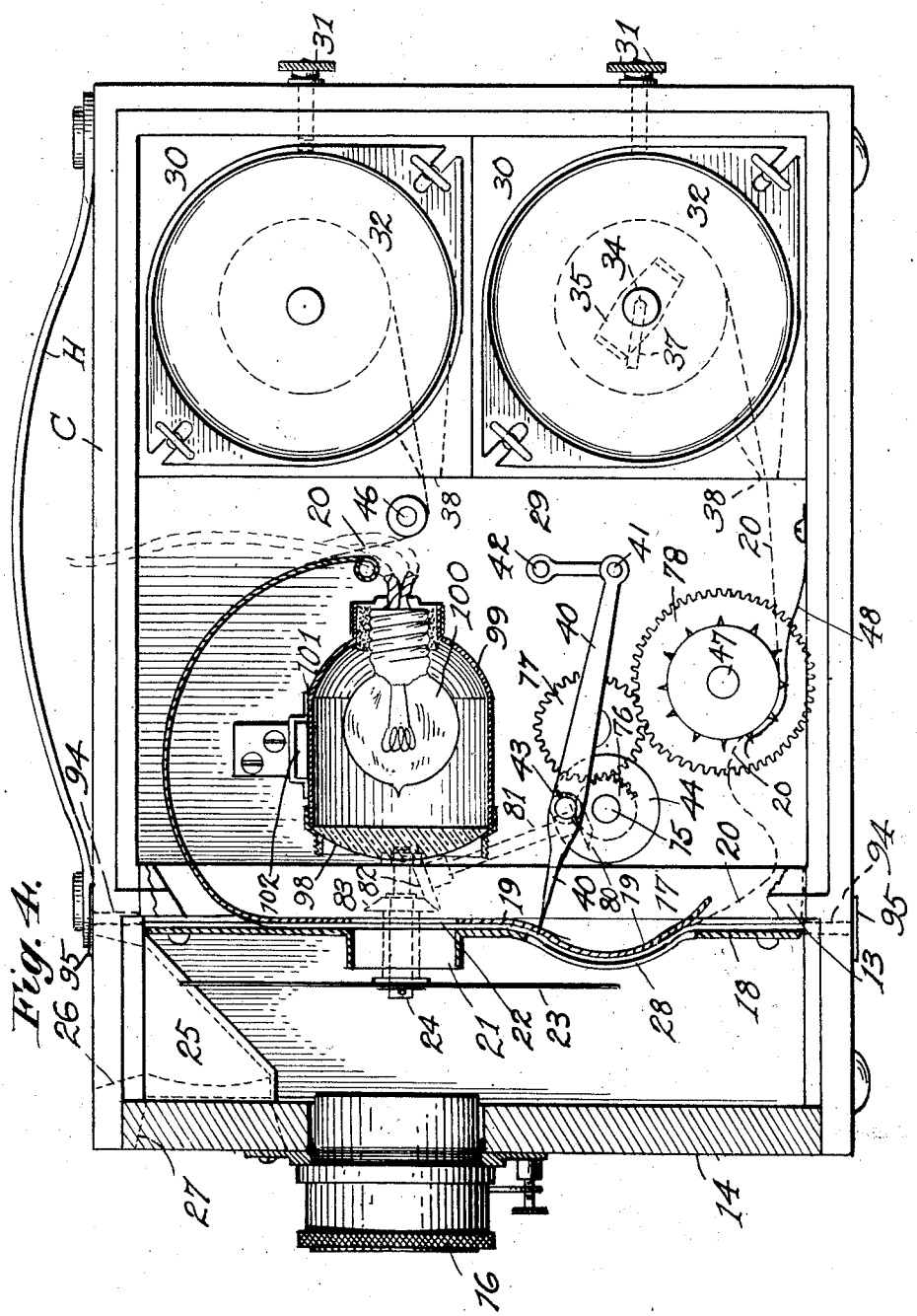

UNITED STATES PATENT OFFICE.

REINHART W. PITTMAN, OF NEW YORK, N. Y.

MOTION-PICTURE APPARATUS.

1,413,610.  Specification of Letters Patent.  Patented Apr. 25, 1922.

Application filed December 12, 1913, Serial No. 806,137. Renewed July 10, 1920. Serial No. 395,378.

*To all whom it may concern:*

Be it known that I, REINHART W. PITTMAN, a citizen of the United States, residing in the borough of Manhattan, in the city, county, and State of New York, have invented new and useful Improvements in Motion-Picture Apparatus, of which the following is a specification.

This invention relates to motion picture apparatus, and relates particularly to a convertible combination apparatus adapted for several uses, such, for instance, as a camera for photographing pictures of successive phases of moving or animate objects upon a web film, a printing apparatus for printing a positive from a negative taken by the camera, and a projecting machine to project the successive phases of such picture so made on to a screen, and it is the object of the invention to provide an apparatus of this character which is simple, cheap and compact in construction and efficient in operation, which is readily portable and may be utilized without the use of a tripod, and to provide an apparatus of this character in which the operative parts are actuated by a spring operated mechanism regulated by a suitable governor making it an automatic device which may be controlled at will by a push-button to set the mechanism in operation or to stop the same.

Other objects and advantages will hereinafter appear.

With these objects in view I provide a rectangular casing to carry the operative mechanism of the apparatus, said casing having a transverse partition adjacent the forward end to form a compartment in the front, the front wall of the casing being in the form of a hinged door carrying a lens whereby access may be had to said compartment, the transverse wall carrying aperture plates and a rotatable shutter being enclosed in said compartment. The portion of the casing in the rear of the transverse wall is divided longitudinally into two compartments, one containing the feeding devices for the film and magazines for the film, while the other compartment contains the spring operated mechanism to actuate the shutter and the film feeding devices. The side walls are in the nature of hinged doors whereby to get access to the one compartment to place the film magazines therein and thread the film through the feeding devices and to get access to the spring operated mechanism contained in the other compartment.

In the drawings accompanying and forming a part of this specification, Figure 1 is a perspective view, partly broken away, of an apparatus illustrating an embodiment of my invention.

Figure 2 is a front elevation with the front door removed to illustrate the mechanism in the front compartment, a part of the transverse wall being broken away to show the governor for the spring operated mechanism.

Figure 3 is a side elevation looking at the rear of Figure 1 with the side door removed to illustrate the spring operated mechanism.

Figure 4 is a side elevation, partly in section, with the side door removed to illustrate the feeding devices and the matter of adapting the apparatus to a picture projecting machine.

Figure 5 is a side elevation of an adjustable device adapted to the film feeding device to vary the length or height of the successive phases of a picture.

Figures 6 and 7 are views of portions of film illustrating pictures of different lengths or heights adapted to be taken by the apparatus.

Figure 8 is a detail view illustrating the push button actuated means to set the operative mechanisms in motion and to stop the same.

Similar characters of reference designate like parts throughout the different views of the drawings.

In the embodiment of my invention illustrated in Figure 1 of the drawings I have shown the apparatus adapted to a camera to photograph successive phases of moving or animate objects. The operative parts of the mechanism are enclosed in a substantially rectangular casing (designated in a general way by C). Extending transversely of the casing adjacent the forward end is a partition or wall 13, the front wall being in the form of a hinged door 14 having an angular portion 15 to constitute a part of one of the side walls and carrying a lens 16 in a suitable manner, thus providing a compartment to which access may be had by the door 14. This wall 13 has a longitudinal opening 17 (Figure 4) in which are removably mounted a pair of plates 18, 19, spaced apart, as shown in Figure 4, to permit of the passage of a web film 20. These plates have alined openings or apertures 21, 22, and which openings are in line with the lens 16, the opening 21 in the forward plate having a forwardly projecting flange extending around the same. A rotatable shutter 23 fixed to the end of a shaft 24 for a purpose to be hereinafter described is enclosed in said compartment. A range finder 25 is located in an upper corner of said compartment, an opening 26 in the top of the casing and an opening 27 in the front registering with said finder. In the preferred form the aperture plates 18, 19 have a correspondingly formed forwardly curved portion, as at 28 in Figure 3, to frictionally retard the movement of the film between said plates and for another purpose to be hereinafter described. The plate 19 is also provided at its upper end with a curved portion to serve as a guide for the film.

The portion of the casing in the rear of the wall 13 is separated longitudinally by a partition or wall 29 into two compartments, and said wall also acts as a support for the operative mechanism of the apparatus. One of these compartments is adapted to receive a pair of superposed magazines 30 for the film releasably retained therein.

As already stated the film passes between the aperture plates 18, 19 and is fed or advanced intermittently by the pointed ends of a pair of pawls 40 engaging in the perforations in the film adjacent its lateral edges. These pawls are fixed at one end to a bar 41 pivotally supported, as at 42, by an arm fixed to said bar to have oscillatory movement. At a point between their ends the pawls are pivotally connected, as at 43, to a continuously revoluble wheel or disk 44, the connection of the pawls to the wheel being eccentric to the axis of rotation of the wheel. By mounting the pawls upon the wheels in this manner the pointed or free ends thereof will have a circular orbit of movement, and when in their uppermost position will engage with the film perforations and advance the film until they reach their lowermost position when they are withdrawn from said perforations. To prevent the pawls entering too far into the film perforations with the consequent rupturing and tearing of the same, the aperture plates are curved forwardly as at 28, and the plates have a pair of longitudinal slots 45 in line with the film perforations to permit of the passage of the pawls during their film advancing movement. In practice the coil of sensitized film is loosely placed on the core in the upper magazine with one end passing through the slot 38 therein. The film is then passed around an idle roller 46, over the curved portion at the top of plate 19, thence between the plates 18, 19 and around the sprocket wheel 47, the film being so threaded that there is a slack portion or loop adjacent the sprocket 47; from thence the film passes to the lower magazine.

A spring 48 is provided to maintain the film in operative relation with the sprocket 47. The plate 18 may also have resilient fingers 49 fixed thereto adapted to pass through adjacent slots in the plates to engage with the film and retard the movement thereof.

By the construction and operation of the film feeding devices just described, and as clearly shown in Figure 4, a portion of the film is fed to produce a picture of a length as shown in dotted lines in Figure 6. In some instances, it is desirable to produce films of different or variable length or heights, for instance, as shown by the dotted lines in Figure 7. For this purpose the pawls are adjustably carried by the wheel 44 to increase or decrease the eccentricity of the connection of the pawls to the wheel relative to the axis of rotation of the latter, and thereby increase or decrease the throw of the pawls.

Suitable means are provided for operating the device. For this purpose I provide a train of gearing actuated by a spring S one end of which is secured, as at 60, and the other end connected to a rotatable shaft 61, the end of which is squared for the application of a key to wind the spring. A gear 62 is loosely mounted on said shaft and connected to the shaft to be actuated by the spring by a ratchet wheel 63 fixed to the shaft and a pawl 64 pivotally carried by the gear to co-operate with said ratchet wheel. The gear 62 meshes with a pinion 65 fixed to a rotatable shaft 66. The film take-up is operated by a belt 67 passing around a pulley 68 on the shaft 66 and a pulley 69 on the shaft 36. This belt is preferably of a resilient structure, such as a coiled spring, whereby said belt will readily slip on the pulleys 68, 69 to compensate for the winding of the film on the reel connected to the shaft 36 and thereby preventing too great a strain on the film with the consequent liability of the breaking of the same. Also fixed to the shaft 66 is a gear 70 meshing with a pinion 71 on a rotatable shaft 72. A gear 73 also fixed to the shaft 72 meshes with a pinion 74 fixed to a shaft 75 and upon which shaft the pawl actuating pulley 44 is also mounted. The sprocket wheel 47 is operated from the shaft 75 by a pinion 76 on said shaft meshing with an idle pinion 77 which meshes with a gear 78 connected to the sprocket wheel 47. It will be noted that all of this mechanism as well as the feeding devices and film magazines or boxes are mounted upon and supported by the partition wall 29.

The shutter 23 to intercept the light rays through the apertures 21, 22 is of the rotary type mounted on the shaft 24 adjacent the apertures in the plates 18, 19, and is in the form of a disk having a segmental cutout portion. The shutter is actuated by the spring through a bevel pinion 79 (Figure 2) fixed to the shaft 75 meshing with a bevel pinion 80 on an angularly supported shaft 81 having a pinion 82 to mesh with a pinion 83 on the shutter shaft 24.

The movements of the train of gearing and thereby the film feeding devices, shutter and film take-up are regulated through the instrumentality of a centrifugal governor consisting of weights 84 carried by resilient arms 85 connected at one end to a worm wheel 86 fixed to vertical shaft 87 co-operating with a worm on the shaft 75 and by means of which the governor is actuated. The upper end of the arms 85 are connected to a collar 88 slidably mounted on the shaft 87. To regulate the speed of the governor a friction disk 89, in the present instance beveled, is connected to the collar 88 with which an adjustable friction member 90 co-operates to retard the rotation of the governor when it has attained a predetermined speed, said friction member 90 consisting of a screw 91.

As stated the mechanism is adapted to be set in motion and stopped at will, and for this purpose I provide a friction member 92 carried at the end of a slidably supported rod 93 and normally maintained in frictional engagement with the disk 89 by a spring 94, the tension of the spring being such as to cause the friction member 92 to bear against the disk 89 with such force as to prevent operation of the mechanism by the spring S. To release the friction member 92 and permit actuation of the mechanism by the spring S, I provide a pivoted lever having a push-button or finger-key to impart movement to the shaft 93 to throw and maintain the friction member 92 out of engagement with the disk 89, when the different mechanisms will be actuated by the spring until such time as the push-button is released and the friction member 92 again engages with the disk 89.

To convert the mechanism from an apparatus for taking pictures of successive phases of a moving object or objects to an apparatus for printing a positive from a negative so taken, the casing is provided with slots 94 in the top and bottom in line with the aperture plates 18, 19, said slots when the apparatus is adapted for taking pictures being closed by flaps 95 to exclude the light from the casing. Adjacent the slot in the top there is provided a suitable support 96 for a coil of developed negative film. The negative film is threaded between the aperture plates to lie adjacent the front plate 18, and the sensitized film upon which a positive is to be printed is contained in the upper magazine and threaded between the aperture plates to lie adjacent the plate 19 and through the feed devices to the lower magazine. The lens is removed from the front wall or door 14 and a suitable electric bulb may be substituted therefore. The mechanism is now started in motion when the film is fed between the aperture plates and a positive printed upon the sensitized film from the negative, both films being synchronously fed by the feeding devices.

To convert the apparatus to project pictures I provide a suitable condensing lens 98 mounted in a carrier, as at 99, an electric light bulb 100 also being mounted in the carrier, the carrier acting as a reflector to reflect the light rays from the light through the lens. The exterior of the carrier has a loop 101 whereby it is adapted to be suspended from a support, as 102, secured to the partition 29 in the compartment for the film feeding devices and the magazines, said support being so located that the lens 98 will be in line with the apertures in the plates 18, 19, and the lens carried by the front wall or door 14. The casing is provided with a hand-grip or handle to readily carry the apparatus.

The arrangement of the film feeding means as set forth in Fig. 5, because of requirement for division has been made subject matter of an application Serial No. 407,889.

Having thus described my invention, I claim:

1. In motion picture apparatus, the combination of a casing separated into a plurality of compartments arranged to provide access to either of said compartments independently of the others; an aperture in the partition between two of said compartments in line with a lens carried by the outer wall of the casing; means in the one compartment to feed a web film across the aperture; a shutter in another compartment to intercept the light rays through the lens to said aperture; a train of gearing carried in another compartment of the casing operatively connected to the film feeding means and shutter to actuate said means and shutter synchronously; a spring in said latter compartment to actuate said gearing; a governor also in said latter compartment to regulate the movement of the mechanism; a member to co-operate with the governor to prevent operation of the mechanism by the spring; and a lever connected at one end with the means to co-operate with the governor and having a finger key at the opposite end exteriorly of the casing to operate said means, substantially as and for the purpose specified.

2. In a motion picture apparatus, a combination of a casing separated by partitions into a plurality of compartments arranged to provide access to either of the compartments independently of the others, a lens carried by the outer wall of the casing, the partition between two of said compartments having an aperture in line with said lens, means in the one said compartment to feed a web film across the aperture; a shutter in the other said compartment to intercept the light rays through the lens to said aperture; operating means including a spring and governor carried in another compartment of the casing operatively connected to the film feeding means and shutter to actuate said means and shutter synchronously, a member in said compartment to co-operate with the governor to prevent operation of the mechanism by the spring, and a lever connected at one end with the member and projecting at the opposite end exteriorly of the casing.

REINHART W. PITTMAN.

Witnesses:
JOHN O. SEIFERT,
PAULA PHILIPP.